United States Patent [19]

Blair

[11] Patent Number: 4,703,159

[45] Date of Patent: Oct. 27, 1987

[54] METHOD OF MANUFACTURING LIGHTWEIGHT THERMO-BARRIER MATERIAL

[75] Inventor: Winford Blair, La Mesa, Calif.

[73] Assignee: The United States of America as represented by the Administrator of the National Aeronautics and Space Administration, Washington, D.C.

[21] Appl. No.: 314,667

[22] Filed: Oct. 26, 1981

Related U.S. Application Data

[63] Continuation-in-part of Ser. No. 165,277, Jul. 2, 1980, abandoned.

[51] Int. Cl.⁴ .................. B23K 1/04; B32B 3/12
[52] U.S. Cl. .................. 219/78.12; 219/78.02; 219/85 E; 219/85 M; 228/181; 428/593; 428/594
[58] Field of Search .......... 428/73, 178, 593, 594; 219/78.11, 78.12, 78.02, 85 E, 85 M; 228/181

[56] References Cited

U.S. PATENT DOCUMENTS

| 1,228,763 | 6/1917 | Ellis | 428/72 |
| 1,914,207 | 6/1933 | Knight | 428/73 |
| 2,481,046 | 9/1949 | Scurlock | 219/78.12 |
| 3,073,268 | 1/1963 | Cole | 219/78.11 |
| 3,151,712 | 10/1964 | Jackson | 428/174 |
| 4,205,118 | 5/1980 | Schubert | 219/78.12 |

FOREIGN PATENT DOCUMENTS

| 54-18232 | 7/1979 | Japan | 228/181 |
| 1438842 | 6/1976 | United Kingdom | 219/85 E |

Primary Examiner—B. A. Reynolds
Assistant Examiner—Alfred S. Keve
Attorney, Agent, or Firm—Robert F. Kempf; Nina M. Lawrence; John R. Manning

[57] ABSTRACT

A method of manufacturing thermal barrier structures comprising at least three dimpled cores separated by flat plate material with the outer surface of the flat plate material joined together by diffusion bonding.

11 Claims, 8 Drawing Figures

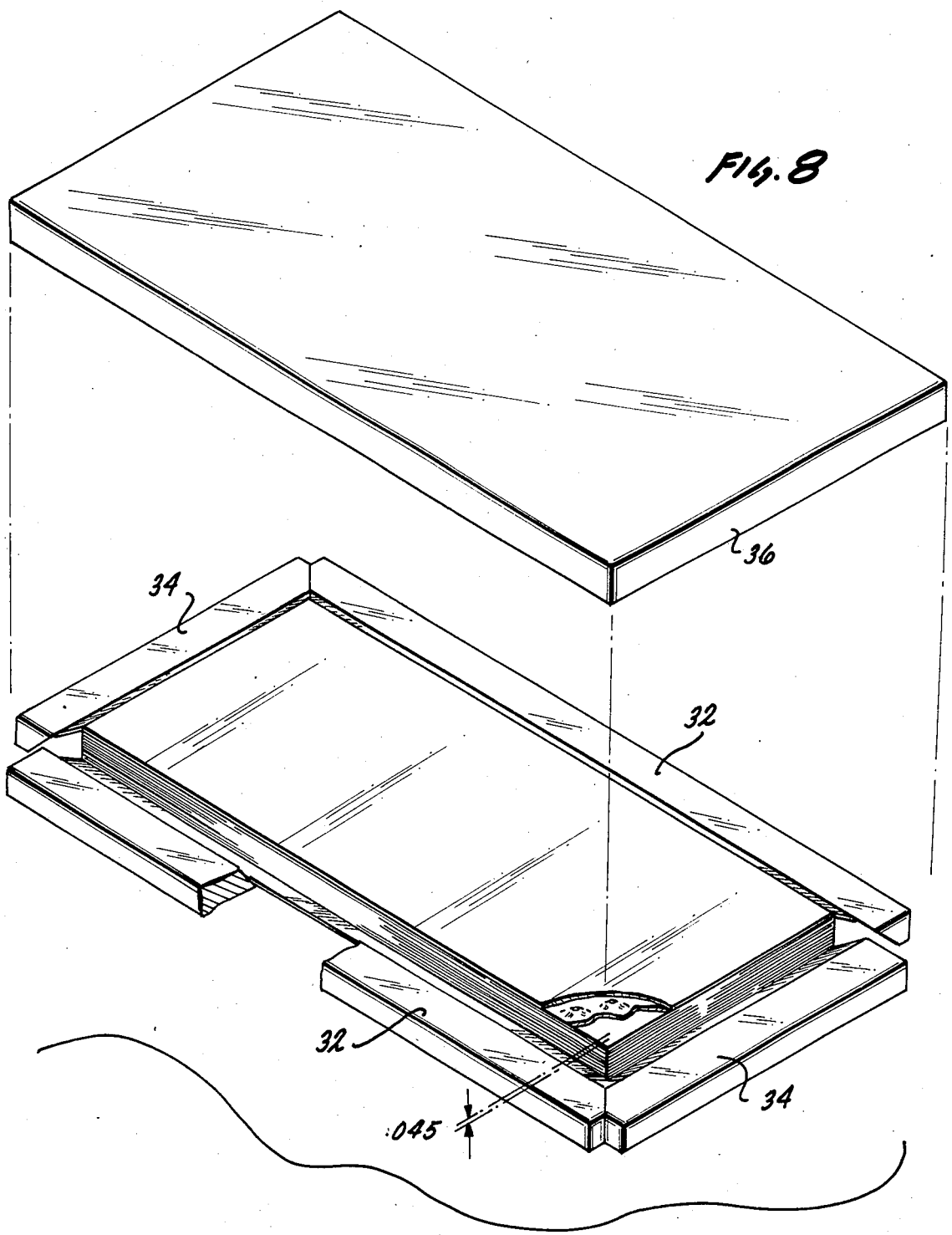

METHOD OF MANUFACTURING LIGHTWEIGHT THERMO-BARRIER MATERIAL

BACKGROUND OF THE INVENTION

This Application is a continuation-in-part of U.S. patent application as Ser. No. 165,277, filed 07/02/80 now abandoned.

This invention relates to a lightweight thermo-barrier material and more particularly a multilayer sandwich material for use as a thermal barrier in space reentry vehicles or the like and other thermal barrier applications.

Prior art thermal barrier material used in spacecraft and the like consists of a ceramic or graphite composite structure, both of which are extremely fragile and easily damaged. Generally, due to the curvilinear contours of space vehicles, the thermo-barrier material generally takes the form of flat or contoured small rectangular tiles. These small tiles allow for attachment to a curvilinear attachment surface and allow for individual repair or replacement when localized damage occurs. It has been found that during vehicle testing, handling, etc., these tiles are continually becoming broken and require replacement. During replacement, additional tiles generally get broken in the repair process, thus further increasing the cost of repairs and possibly causing critical vehicle flight schedules to be missed. The actual thermo-barrier material of the prior art devices have been substantially successful in isolating thermal transfer from outer surfaces to the inner surfaces of the vehicle.

There has not been an adequate lightweight high strength material for use as thermo-barrier structures, particularly in spacecraft environment until the emergence of the instant invention.

SUMMARY OF THE INVENTION

The invention comprises a multilayer dimpled sheet core material constructed of titanium alloys, inconel, TD nickel, niobium and other super alloys, aluminum or the like or a combination of two differenct types of construction material, such as, titanium in combination with inconel. When a single type of material is used, such as titanium, diffusion bonding is the preferred method of joining the componenets of the multilayer structure together to form a unit. When materials other than titanium are used to construct the thermo-barrier material, brazing may be the preferred method of joining the inner stacked components. When titanium is used with inconel, for example, a combination of diffusion bonding and brazing is required.

The dimpled core material is superplastically formed in a vacuum furnace using 1.2 pounds per square inch dead weight pressure. After the dimpled sheets are formed they are trimmed by coating the sheets with a chem-mill resistance material and then lazer scribing to burn or etch away the resistant at the location to be trimmed so that when the scribed sheets are placed in a chem-mill solution the unwanted material will be etched away.

The lay up for liquid interface diffusion bonding (LID) is then accomplished by aligning the dimples or nodes opposing each other with a septum sheet between each layer of adjacent dimpled sheets, placing an outer thin shin as the top and bottom outer surface and resistance welding each corner of the lay up (attaching all stacked components together, one to the other). This holds the dimpled sheets, septurn sheets and outer skins in position for LID bonding. The lay up is then placed on a flat or contour graphite reference block with additional graphite blocks positioned on each of the four sides of the lay up. The side blocks control the panel height and prevent the components of the lay up from being crushed by a second graphite block placed on the top of the lay up for bonding pressure.

The skins also form a vacuum tight panel sides. The skins are corregated on the sides which become a vertical enclosure for the dimpled and septurn sheets. The corregation are also superplasticly formed.

OBJECTS OF THE INVENTION

It is an object of this invention to fabricate a nonfragile and lightweight thermal barrier material for use as a thermoprotection for the primary structures of spacecraft type vehicles to protect their payloads and possibly human inhabitants during launching and reentry.

A further object of this invention is to provide thermal barrier material that is easily attached and removed from its attached or supporting structure.

A further object is to superplasticly form the dimpled sheet core material.

A further object is to provide shims to be used between a reference surface and the dead weight used during bonding to prevent crushing of the superplasticly formed dimpled sheets.

A still further object is to prevent damage to the dimpled sheet core material when trimming prior to assembly into the thermo barrier material.

These and other objects and advantages of the invention will become better understood by reference to the following detailed description when considered with the drawings, in which:

BRIEF DESCRIPTION OF THE DRAWINGS

FIG. 8 is an exploded perspective showing of the blocks and shims used in the bonding together of the components of the lay up.

DETAILED DESCRIPTION OF THE FIGURES

Figure 1:
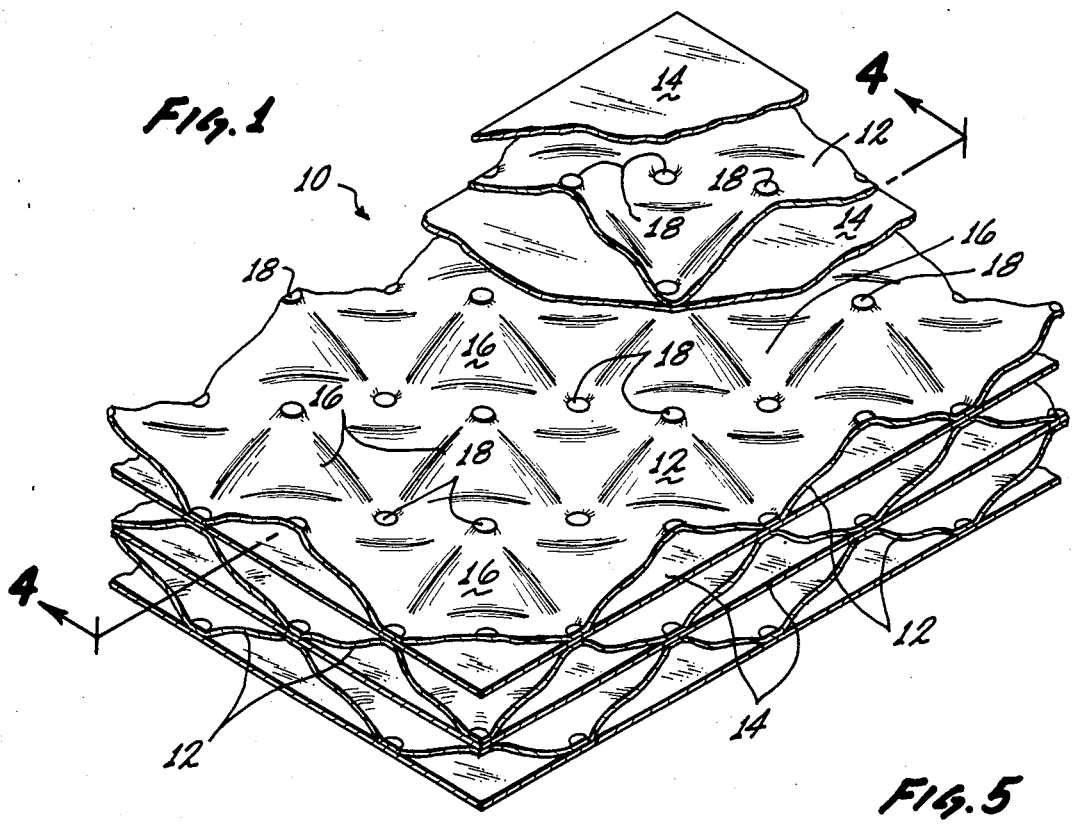
FIG. 1 is a perspective partially sectional cutaway showing of the thermo-barrier structure.
Figure 5:
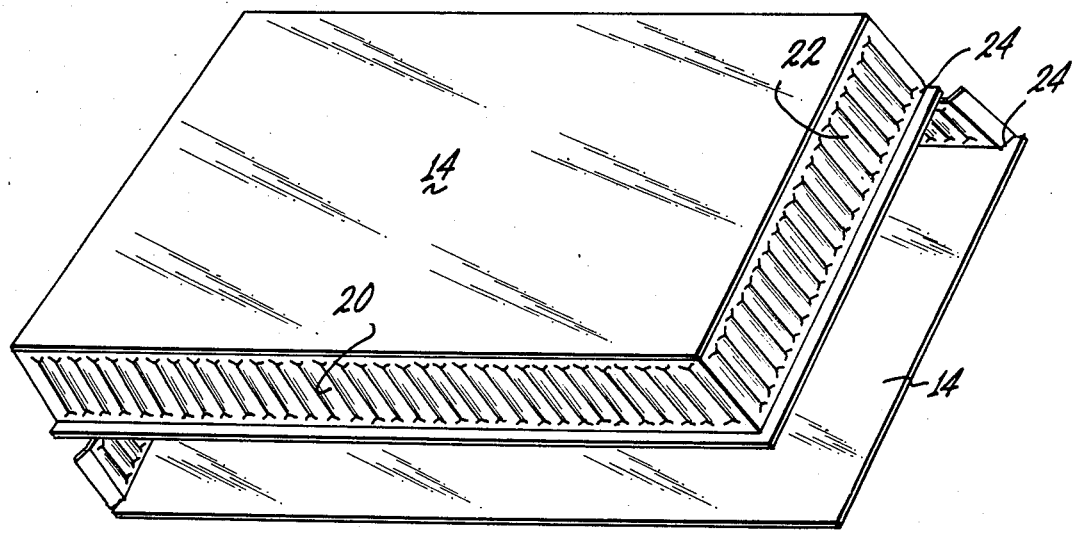
FIG. 5 is a showing of the outer flat sheer material with sealing lip extensions.
Figure 2:
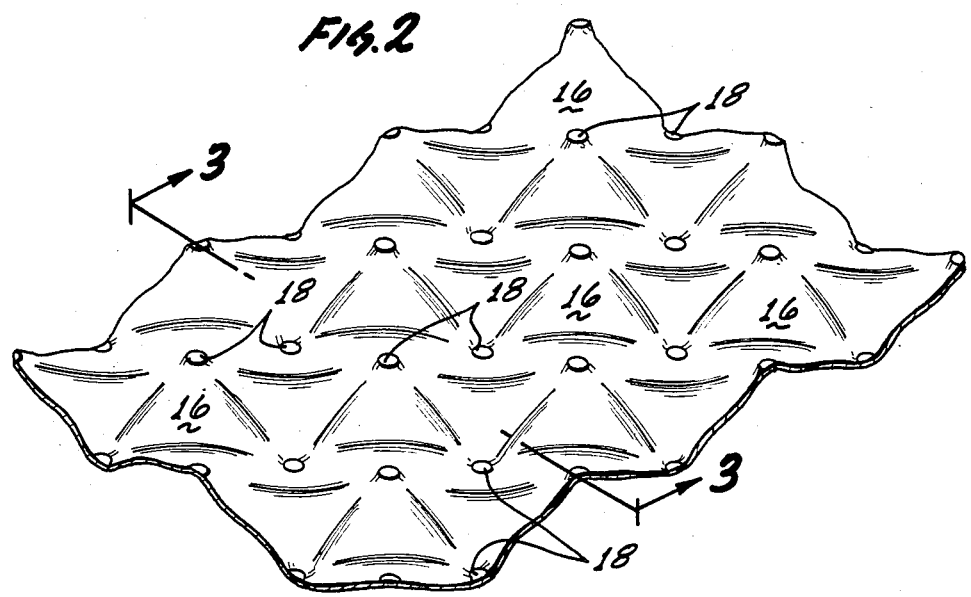
FIG. 2 is a partly sectional perspective fragmentary view of the cellular core material.
Figure 3:
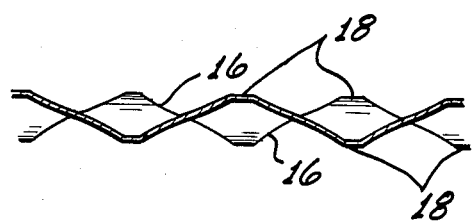
FIG. 3 is a showing of FIG. 2 taken along line 3—3.

Referring now to the various figures, FIG. 1 shows a perspective sectional cutaway view of the lightweight thermo-barrier material 10 of the instant invention. The lightweight thermo-barrier material 10 comprises central dimpled cores 12 sandwiched between flat sheet material 14. Although four dimpled cores 12 are shown along with three inner sheets and two outer sheets of flat sheet material, it should be clearly understood that as few as three dimpled cores 12, two inner sheets and two outer sheets of flat material may be utilized to practice this invention. The maximum number of dimpled cores 12 and accompanying sheets of flat sheet material 14 is unknown and would be determined only by size and construction limitations. The finite number of dimpled cores 12 and accompanying sheets of flat sheet material 14 are determined by the required heat differential between one outer surface which is exposed to a heat source (the hot face) and the opposite surface (the cold face).

Figure 6:
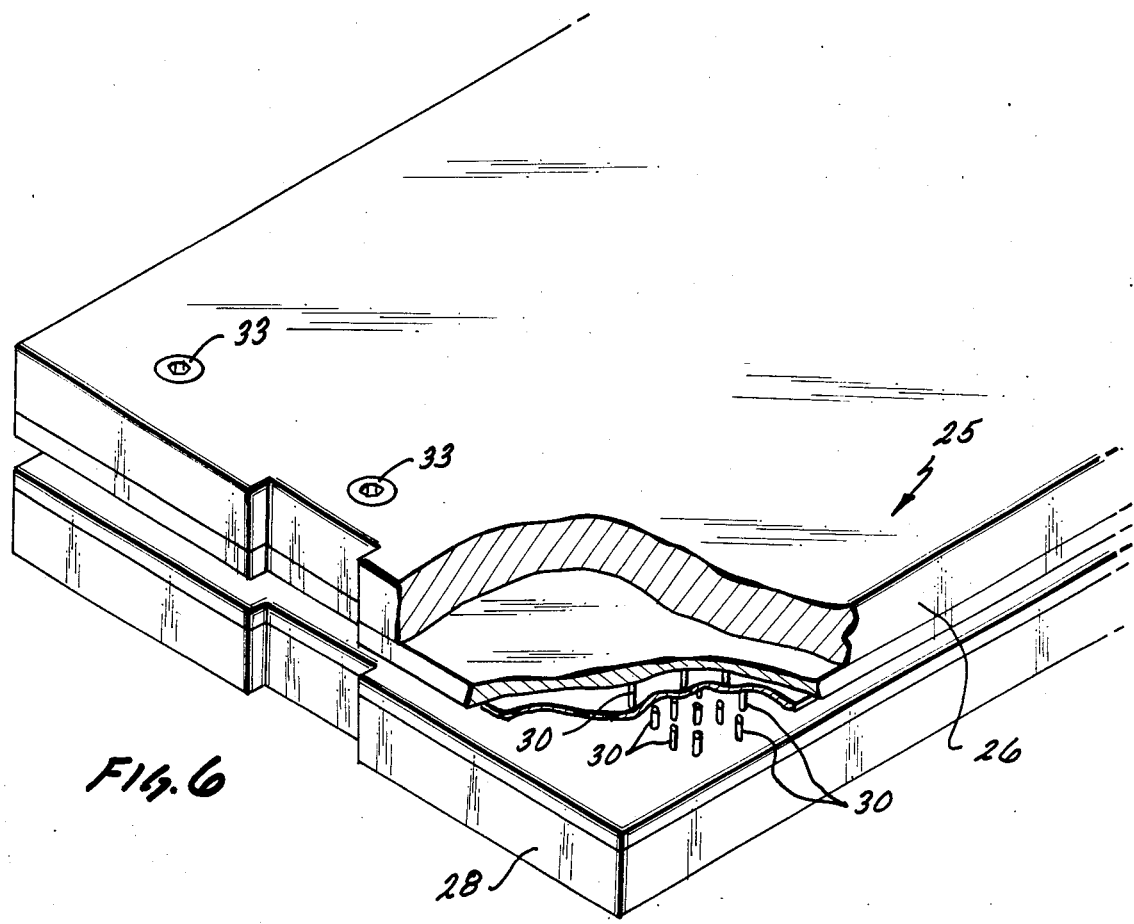
FIG. 6 is an exploded perspective showing of the tool used for superplasticly forming the dimpled sheet core material.
Figure 7:
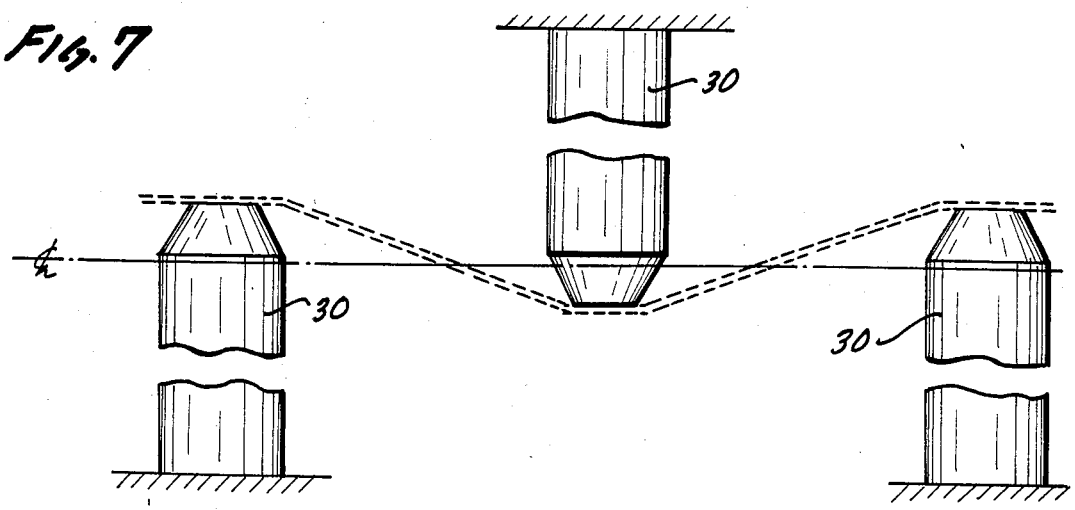
FIG. 7 is an enlarged showing of the dimple forming pin, FIG. 6.

Referring now to FIGS. 6 and 7, the dimpled core material 12 is superplasticly formed in a vacuum furnace by tool 25. The tool comprises a pair of opposing halves 26, 28. Each tool half include a plurality of extended pins 30. When the two tool halves are in forming position the pins of each half are adjacent and rest substantially centered between opposing pins. The two halves are held in vertical alignment by smooth bolts 33 which allow relative vertical movement between the halves. For dimpled sheet forming, a sheet of flat material to be formed is placed between the tool halves wherein the pins of the upper tool rest on the sheet. A dead weight of approximately 1.2 pounds per square inch for typical core thickness is then placed on the upper surface of the upper most tool. It should be understood that different amounts of dead weight would be utilized for different types or thicknesses of material. The tool and material combination is then placed into the vacuum furnace where the temperature is elevated until the sheet of flat material becomes plastic. The dead weight then forces the upper tool half to rest within the lower tool half causing the pin contacting surface to be forced into the voids between the pins of the two tool halves thus forming the dimpled core material.

After the dimpled core is formed and cooled, it is ready for trim to selected size for forming the thermo-barrier material 10. The dimpled core is completely coated with a chem-mill resistant material. The chem-mill resistant material is then scribed using a low power laser, such as, for example, a 150 watt $CO^2$ type laser. The scribed dimpled core material is then placed in a suitable chem-mill solution wherein the portion along the scribe line is removed. The laser is the preferred means of scribing because of the hill and dale surface contour of the dimpled sheet. It is substantially impossible to scribe a true dimension by any other means.

The core 12 is typically a thin metalic foil of from 0.093 to 0.250 inches in thickness, the inner sheets of flat material from 0.001 to 0.003 inches in thickness, with a thickness substantially 0.0015 inches being preferred, and the facing sheets 0.003 to 0.005 inches in thickness. It should be understood that the foil thickness of the cores 12 and the flat sheet material 14 may vary in the same lightweight thermo-barrier material, i.e. some core structure and flat sheets within a single sandwich structure may be thinner than other within the same structure.

The cellular dimpled core structure comprises a plurality of nodes or dimples 16 extending equally in opposite directions from a common midplane. The ends 18 of the nodes 16 are substantially flat and this flat surface is substantially parallel with the core midplane. The flat node ends 18 are shown in the various drawings as circular. It should be understood that these nodes may take any peripheral end configuaration providing that the end surface remains substantially flat and parallel with the core midplane.

It may be desirable for some applications of the lightweight thermo-barrier material of this invention to evacuate the central cores and adjacent sheets of flat sheet material to provide a dead air space therein to improve the insulation between the hot and cold faces. To accomplish this vacuum seal, each of the end sheets 14 of flat sheet material are extended in length and width and these extensions 20, 22 form one end and one side of the structure. The length of the extensions are substantially equal to the thickness of the stacked material which it will enclose. When placed in position to form the hot and cold face sheets, the outer sheets of flat sheet material form a cocoon around the inner cellular cores and flat sheet material. A sealing lip 24 is provided around the edge of the length and width extensions 20, 22 to provide for sealing with the outer face sheet 14.

Although the discussion and figures are directed toward the forming of rectilinear thermo-barrier material, it should be fully understood that the various components may be formed in any substantially equal curvilinear shapes prior to their assembly and bonding.

The desired overall strength and temperature dissipation range are the principal basis for the choice of the type or types of material used in the construction. Where expected, temperature differentials between the hot and cold face sheets are for example 4 to 1 (1,000° F. on the hot face and 250° F. on the cold face), titanium is preferred because of its light weight. When the temperature differential between the hot and cold face sheet is for example in the range of from 0.04 to 8:1 (10° to 2000° F. on the hot face and 250° F. on the cold face) super alloys may be employed. Examples of these super alloys are TD nickel, niobium inconel, stainless steel and the like.

A METHOD OF MANUFACTURING

When the entire thermo-barrier panel is constructed of titanium, liquid interface diffusion bonding (LID) is the preferred method of joining together the various stacked components. To practice this joining method, the materials of construction are first selected for size. The dimpled core material and the adjacent sheets of flat sheet material are sized to substantially equal dimensions. In the event that the outer sheets (the hot and cold face sheets) are to enclose the material for vacuum sealing, two sides of each toward the opposite end sheet and the edge of the extensions forms a sealing lip.

The components are then cleaned so as to be free of any surfacants that might affect their joining by this method. Any suitable or well known cleaning methods may be utilized to practice this invention.

The flat surface of the nodes of each sheet of cellular core material are then plated sequentially by well known means with layers of nickel, copper, and silver. The plating layers are substantially equal by weight. The ideal range of weight for each layer is from $2\frac{2}{3}$ to $3\frac{1}{2}$ grams per square foot. Layers of substantially 3 grams per square foot each are preferred. It should be understood that the flat sheet material could be plated rather than the nodes to practice this invention.

When a vacuum seal is desired between the outer sheet of flat sheet material, the lip along the extension is plated in the same manner as the node on the edge side adjacent the opposite outer sheet.

Figure 4:
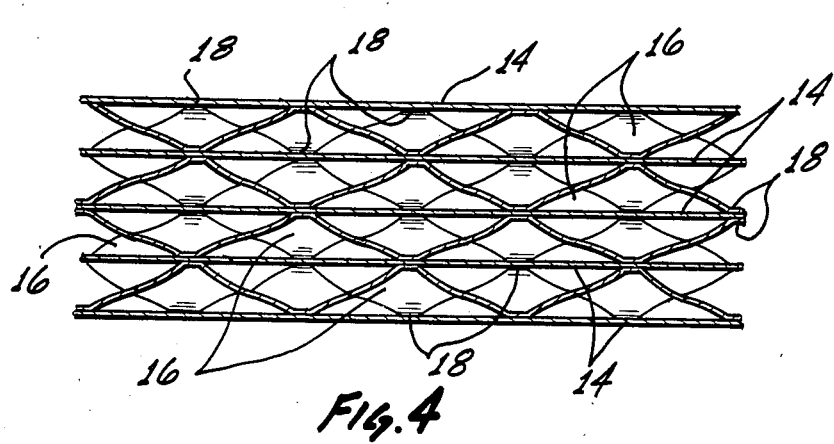
FIG. 4 is a showing of FIG. 1 taken along line 4—4.

The next step is to secure together the cellular core material and the flat sheet material in assembly order, that is, that order as shown in FIGS. 1 and 4. This securing step is to maintain the various components in proper bonding position which includes the substantial vertical alignment of the nodes of the cellular core material. The preferred method of securing the various components together in stacked order is by resistance tack welding. Each component is tack welded at selected locations to each of its adjacent components. It has been found that satisfactory securing is accomplished by placing approximately five welds in each corner of each of the adjacent components.

The secured together components are then placed on a reference surface which has the contour of the stacked components, i.e., rectilinear or curvilinear. The reference surface may be, for example, graphite or like or any other suitable type material for the purpose intended.

A suitable means is used to apply pressure between the stacked components, such as, but not limited to, a dead weight constructed of graphite or the like.

Referring now to FIG. 8, a pair of longitudinal bonding aids 32 and a pair of tranverse bonding aids 34 are employed to control the pressure applied to the stack components by the pressure applying means 36 to prevent distortion or damage to the assembly. The components when stacked in assembly order on a graphite or the like reference surface extend approximately 0.045 inches above the properly positioned bonding aid pairs. The outer most components of the assembly are isolated from the reference surface and bonding aids by use of titanium slip sheets, not shown.

The assembly including the reference surface, pressure applying means, and pressure control means are then placed into a vacuum furnace for liquid interface diffusion bonding. The inner heat chamber of the furnace is then evacuated to approximately $1 \times 10^{-5}$ torr, then heated to approximately 940° C. and held at this temperature level for approximately 90 minutes. During this time period, the plated material forms a eutectic melt and is diffused into the component materials creating a diffusion bond joint at all of the contacting plated interfaces. The oven is then allowed to cool and the now bonded thermo-barrier material is then removed and subsequently ready for its ultimate use. The assembly having the material outer surface edges bonded cause the inner structure to retain the furnace vacuum of substantially $1 \times 10^{-5}$ torr therein.

A SECOND METHOD OF MANUFACTURE

When the thermo-barrier material is constructed from two different types of material, bi-metal construction, a combination of liquid interface diffusion bonding (LID) and brazing is utilized. Commonly, one material will be titanium which is readily bonded together under the LID method described above the other material a superplastic alloy or aluminum wich do not LID bond well but may be successfully brazed.

The cellular core material, for example inconel, is prepared for brazing. At least the nodes are coated with an acrylic binder, such as nicrobraz 600 cement manufactured by Wall Calmonoy, or the like. While the binder coating is still wet, a powder braze alloy is applied evenly over the binder coated surfaces. The powdered braze alloy used may, for example, have a mesh size from $-140$ to 270. The braze alloy is spray coated on the binder coating by a spray apparatus well known in this art to insure a uniform coating. An example of one spray apparatus is fully described in U.S. Pat. No. 3,656,224.

One or more of the dimpled cores may be constructed of titanium as well as their adjacent sheets of flat sheet material. All of the components are selected for size and degreased. The flat surface of the nodes of each of the titanium cellular cores are plated with layers of nickel, copper and silver. The titanium components are then secured together, placed on a reference surface and placed within a vacuum furnace. Pressure applying means and pressure control means are then added to the assembly for bonding. The furnace is then evacuated and its temperature is elevated to a selected level and held at that level until a diffusion bond joint between the components is formed at the nodes.

The components are then stacked in assembly order. The components to be brazed together are secured together by resistance tack welding as hereinabove discussed or by any other convenient means.

The stacked and secured components are then placed on a reference surface within a vacuum furnace. Pressure is then applied to the stack and is controlled by a pressure control means such as that hereinbefore discussed. The furnace is then evacuated to approximately $1 \times 10^{-5}$ torr. The internal furnace temperature is then elevated to the melting temperature of the braze alloy. The assembly is then cooled and removed from the furnace.

If the outer surfaces are to form a vacuum type seal with the cores and inner flat sheet material, then the surface sheets are formed as discussed above and braze alloy is deposited along the lip joining surfaces.

Although the foregoing invention has been descrbved in some detail in the way of illustrations and examples for purposes of clarity and understanding, it should be understood that certain changes and modifications may be practiced within the spirit of the invention and are limited only by the scope of the appended claims.

What is claimed as new and useful and desired to be secured by United States Letter Patent is:

1. A method of manufacturing a lightweight metallic structure having stacked dimpled core structures with nodes each having a flat surface projecting in opposite directions from a midplane and flat material sandwiched between each of the stacked dimpled core structures and on the outer surface of the outer most stacked dimpled core structure for forming an end surface thereto, said dimpled core structure and flat plate material comprising thin metallic foil material, with the foil thickness of some of the dimpled core structures and flat plate material being thinner than the others comprising the steps of:

selecting component material of a selected size;
providing plating material between at least the node and flat plate connecting surface;
securing together the stacked components;
positioning the nodes of the dimpled core material in substantially vertical alignment during the securing together of the components;
placing the secured together components on a reference surface;
arranging the secured together components to a predetermined height and subjecting said components to a predetermined pressure against the reference surface, said predetermined pressure and height are provided by rigid tools and dead weight means, wherein said rigid tools surround the components of said lightweight metallic structure and extend to a height less than the height of the stacked components and said dead weight means forces said components downward to a vertical height equal to the height of said rigid tools;
placing the secured together components and reference surface in a vacuum furnace; and elevating the temperature within the furnace and maintaining that elevated temperature sufficiently long to cause a eutectic melt of the plating materials and diffuse the plating materials into the base material of the adjacent components creating a diffusion bond between the node flat surface and adjacent flat plate material while maintaining the predetermined height and predetermined pressure to prevent crushing of the dimpled core material during the eutectic melting and diffusion bonding sequence.

2. The method as defined in claim 1, wherein said plating material is first applied to the flat node surface.

3. The method of claim 1, wherein the plating material comprises sequentially applying layers of nickel, copper and silver.

4. The method of claim 2, wherein the layers of plating materials are substantially equal by weight.

5. The method of claim 3, wherein each layer of plating is from $2\frac{2}{3}$ to $3\frac{1}{2}$ grams per square foot.

6. The method of claim 3, wherein each layer of plating is substantially 3 grams per square foot.

7. The method of claim 1, wherein the components are secured together by resistance welding together each adjacent component at select locations.

8. The method of claim 1, wherein the temperature within the furnace is elevated to approximately 940° C. and maintained at that temperature for approximately 90 minutes.

9. The method of claim 1, wherein said predetermined pressure and height are provided by rigid tools and dead weight means, wherein said rigid tools surround the components of said lightweight metallic structure and extend approximately 0.045 inches less than the height of the stacked components and said dead weight means forces said components downward to a vertical height equal to the height of said rigid tools.

10. The method of claim 1, wherein the dimpled core material is sized by:
coating the entire surface of an unsized sheet of dimpled core material;
scribing said sheet of dimpled core material to the desired dimension by burning away the resistant material with a laser beam; and
emerging said scribed sheet of dimpled core material into a chem-mill solution, whereby the exposed material outside of the scribed area is removed.

11. Thermo-barrier material manufactured by the method of claims 1 or 9.

* * * * *